(12) United States Patent
Moore et al.

(10) Patent No.: US 7,617,383 B2
(45) Date of Patent: Nov. 10, 2009

(54) CIRCULAR REGISTER ARRAYS OF A COMPUTER

(75) Inventors: Charles H. Moore, Sierra City, CA (US); Jeffrey Arthur Fox, Berkeley, CA (US); John W. Rible, Santa Cruz, CA (US)

(73) Assignee: VNS Portfolio LLC, Cupertino, CA (US)

( * ) Notice: Subject to any disclaimer, the term of this patent is extended or adjusted under 35 U.S.C. 154(b) by 237 days.

(21) Appl. No.: 11/503,372

(22) Filed: Aug. 11, 2006

(65) Prior Publication Data

US 2007/0192576 A1 Aug. 16, 2007

Related U.S. Application Data

(63) Continuation-in-part of application No. 11/441,818, filed on May 26, 2006, which is a continuation-in-part of application No. 11/355,513, filed on Feb. 16, 2006.

(60) Provisional application No. 60/818,084, filed on Jun. 30, 2006, provisional application No. 60/788,265, filed on Mar. 31, 2006, provisional application No. 60/797,345, filed on May 3, 2006.

(51) Int. Cl.
*G06F 12/00* (2006.01)
(52) U.S. Cl. .................................... 712/202
(58) Field of Classification Search ................. 712/202
See application file for complete search history.

(56) References Cited

U.S. PATENT DOCUMENTS

| | | | | |
|---|---|---|---|---|
| 3,757,306 A | 9/1973 | Boone | ..................... | 340/172.5 |
| 4,107,773 A | 8/1978 | Gilbreath et al. | ............ | 364/200 |
| 4,215,422 A | 7/1980 | McCray et al. | ............. | 364/900 |
| 4,298,932 A | 11/1981 | Sams | .......................... | 364/200 |
| 4,462,074 A | 7/1984 | Linde | .......................... | 364/200 |
| 4,589,067 A | 5/1986 | Porter et al. | ................ | 364/200 |
| 4,593,351 A | 6/1986 | Hong et al. | .................. | 364/200 |
| 4,821,231 A | 4/1989 | Cruess et al. | ............... | 364/900 |
| 4,984,151 A | 1/1991 | Dujari | ........................ | 364/200 |
| 5,029,124 A | 7/1991 | Leahy et al. | ................ | 364/900 |
| 5,053,952 A * | 10/1991 | Koopman et al. | ........... | 712/248 |
| 5,218,682 A | 6/1993 | Frantz | ........................ | 395/325 |

(Continued)

FOREIGN PATENT DOCUMENTS

EP 0156654 10/1985

(Continued)

OTHER PUBLICATIONS

Koopman Jr.,Phillp. , Stack Computers the new wave published by Ellis Horwood, 1989.,pp. 1-232.*

(Continued)

*Primary Examiner*—Eric Coleman
(74) *Attorney, Agent, or Firm*—Henneman & Associates, PLC; Larry E. Henneman, Jr.

(57) ABSTRACT

A stack processor comprises a data stack with a T register, an S register, and eight hardwired bottom registers which function in a circular repeating pattern. The stack processor also comprises a return stack containing an R register, and eight hardwired bottom registers which function in a circular repeating pattern. The circular register arrays described herein eliminate overflow and underflow stack conditions.

65 Claims, 6 Drawing Sheets

U.S. PATENT DOCUMENTS

| | | | | |
|---|---|---|---|---|
| 5,317,735 | A | | 5/1994 | Schomberg ................ 395/650 |
| 5,319,757 | A | * | 6/1994 | Moore et al. .................. 712/32 |
| 5,359,568 | A | * | 10/1994 | Livay et al. ................. 365/221 |
| 5,375,238 | A | | 12/1994 | Ooi ............................ 395/700 |
| 5,377,333 | A | | 12/1994 | Nakagoshi et al. .......... 395/325 |
| 5,390,304 | A | | 2/1995 | Leach et al. ................ 395/375 |
| 5,396,609 | A | | 3/1995 | Schmidt et al. .............. 395/425 |
| 5,410,723 | A | | 4/1995 | Schmidt et al. .............. 395/800 |
| 5,440,749 | A | | 8/1995 | Moore et al. ................ 395/800 |
| 5,485,624 | A | | 1/1996 | Steinmetz et al. ........... 395/775 |
| 5,535,393 | A | | 7/1996 | Reeve et al. ................ 395/700 |
| 5,535,417 | A | | 7/1996 | Baji et al. .................... 395/842 |
| 5,551,045 | A | | 8/1996 | Kawamoto et al. .......... 395/775 |
| 5,572,698 | A | * | 11/1996 | Yen et al. .................... 711/110 |
| 5,657,485 | A | | 8/1997 | Streitenberger et al. ..... 395/595 |
| 5,692,197 | A | | 11/1997 | Narad et al. ................ 395/750 |
| 5,706,491 | A | * | 1/1998 | McMahan .................. 712/234 |
| 5,717,943 | A | | 2/1998 | Barker et al. ................ 395/800 |
| 5,727,194 | A | | 3/1998 | Shridhar et al. ............. 395/588 |
| 5,740,463 | A | | 4/1998 | Oshima et al. ......... 395/800.11 |
| 5,752,259 | A | | 5/1998 | Tran .......................... 711/125 |
| 5,784,602 | A | | 7/1998 | Glass et al. ................. 395/561 |
| 5,826,101 | A | | 10/1998 | Beck et al. ............. 395/800.34 |
| 5,893,148 | A | * | 4/1999 | Genduso et al. ............ 711/132 |
| 5,911,082 | A | | 6/1999 | Monroe et al. ......... 395/800.35 |
| 6,003,128 | A | | 12/1999 | Tran .......................... 712/241 |
| 6,023,753 | A | | 2/2000 | Pechanek et al. ............. 712/18 |
| 6,038,655 | A | | 3/2000 | Little et al. ................... 712/32 |
| 6,085,304 | A | | 7/2000 | Morris et al. ................ 712/22 |
| 6,101,598 | A | | 8/2000 | Dokic et al. ................ 712/227 |
| 6,112,296 | A | * | 8/2000 | Witt et al. ................... 712/222 |
| 6,145,061 | A | * | 11/2000 | Garcia et al. ................ 711/154 |
| 6,145,072 | A | | 11/2000 | Shams et al. ................ 712/22 |
| 6,148,392 | A | * | 11/2000 | Liu ............................ 712/202 |
| 6,154,809 | A | | 11/2000 | Ikenaga et al. .............. 711/108 |
| 6,173,389 | B1 | | 1/2001 | Pechanek et al. ............. 712/24 |
| 6,178,525 | B1 | | 1/2001 | Warren ........................ 714/37 |
| 6,219,685 | B1 | | 4/2001 | Story ......................... 708/498 |
| 6,223,282 | B1 | | 4/2001 | Kang .......................... 712/241 |
| 6,279,101 | B1 | | 8/2001 | Witt et al. ................... 712/215 |
| 6,353,880 | B1 | | 3/2002 | Cheng ........................ 712/200 |
| 6,367,005 | B1 | | 4/2002 | Zahir et al. ................. 712/228 |
| 6,381,705 | B1 | | 4/2002 | Roche ........................ 713/601 |
| 6,427,204 | B1 | | 7/2002 | Arimilli et al. ............. 712/206 |
| 6,449,709 | B1 | | 9/2002 | Gates ......................... 712/202 |
| 6,460,128 | B1 | | 10/2002 | Baxter et al. ................. 712/11 |
| 6,507,649 | B1 | | 1/2003 | Tovander .................... 379/230 |
| 6,598,148 | B1 | | 7/2003 | Moore et al. ................ 712/32 |
| 6,665,793 | B1 | * | 12/2003 | Zahir et al. ................. 712/228 |
| 6,725,361 | B1 | | 4/2004 | Rozas et al. ................ 712/222 |
| 6,825,843 | B2 | | 11/2004 | Allen et al. ................. 345/522 |
| 6,826,674 | B1 | | 11/2004 | Sato ........................... 712/200 |
| 6,845,412 | B1 | | 1/2005 | Boike et al. ................. 710/36 |
| 6,959,372 | B1 | | 10/2005 | Hobson et al. .............. 711/168 |
| 7,028,163 | B2 | * | 4/2006 | Kim et al. ................... 712/202 |
| 7,079,046 | B2 | | 7/2006 | Tanaka .................. 340/870.07 |
| 7,089,438 | B2 | | 8/2006 | Raad .......................... 713/322 |
| 7,136,989 | B2 | | 11/2006 | Ishii ........................... 712/23 |
| 7,155,602 | B2 | | 12/2006 | Poznanovic .................... 713/1 |
| 7,162,573 | B2 | | 1/2007 | Mehta ........................ 711/109 |
| 7,197,624 | B2 | | 3/2007 | Pechanek et al. ............. 712/11 |
| 7,263,624 | B2 | | 8/2007 | Marchand et al. ........... 713/324 |
| 7,269,805 | B1 | | 9/2007 | Ansari et al. ................. 716/4 |
| 2002/0010844 | A1 | | 1/2002 | Noel et al. .................. 711/153 |
| 2003/0028750 | A1 | | 2/2003 | Hogenauer .................. 712/10 |
| 2003/0065905 | A1 | | 4/2003 | Ishii ........................... 712/23 |
| 2003/0217242 | A1 | | 11/2003 | Wybenga et al. ............ 711/163 |
| 2004/0003219 | A1 | | 1/2004 | Uehara ....................... 712/241 |
| 2004/0059895 | A1 | * | 3/2004 | May et al. .................. 712/223 |
| 2004/0107332 | A1 | | 6/2004 | Fujii et al. .................... 712/16 |
| 2004/0143638 | A1 | | 7/2004 | Beckmann et al. .......... 709/212 |
| 2004/0250046 | A1 | | 12/2004 | Gonzalez et al. .............. 712/11 |
| 2005/0027548 | A1 | | 2/2005 | Jacobs et al. ................... 705/1 |
| 2005/0114565 | A1 | | 5/2005 | Gonzalez et al. ............. 710/36 |
| 2005/0149693 | A1 | | 7/2005 | Barry .......................... 712/34 |
| 2005/0206648 | A1 | | 9/2005 | Perry et al. .................. 345/557 |
| 2005/0223204 | A1 | | 10/2005 | Kato ........................... 712/241 |
| 2006/0101238 | A1 | | 5/2006 | Bose et al. .................. 712/206 |
| 2006/0149925 | A1 | | 7/2006 | Nguyen et al. ................ 712/23 |
| 2006/0248317 | A1 | | 11/2006 | Vorbach et al. ............. 712/221 |
| 2006/0259743 | A1 | | 11/2006 | Suzuoki ...................... 712/220 |
| 2007/0113058 | A1 | | 5/2007 | Tran et al. ................... 712/241 |
| 2007/0192504 | A1 | | 8/2007 | Moore ........................ 709/232 |

FOREIGN PATENT DOCUMENTS

| | | |
|---|---|---|
| EP | 0227319 | 7/1987 |
| EP | 0992896 | 4/2000 |
| EP | 1182544 | 2/2002 |
| EP | 1821211 | 8/2007 |
| WO | WO97/15001 | 4/1997 |
| WO | WO00/42506 | 7/2000 |
| WO | WO 02/50700 | 6/2002 |
| WO | WO02/088936 | 11/2002 |
| WO | WO03/019356 | 3/2003 |
| WO | WO2005/091847 | 10/2005 |

OTHER PUBLICATIONS

Sharangpani, H etal. , Itanium Processor Microarchitecture. IEEE, 2000.pp. 24-43.*

Scholz.T etal. An Improved Dynamic Register Array Concept for High-Performance RISC Processors, IEEE 1995, pp. 181-190.*

*Ambric's New Parallel Processor; Globally Asynchronous Architecture Eases Parallel Programming*; Tom R. Halfhill; Microprocessor Report, Scottsdale, Az; Oct. 10, 2006; pp. 1-9.

*An Asynchronous Array of Simple Processors for DSP Applications*; Zhiyi et al., Yu; IEEE International Conference Digest of Technical Papers, Feb. 6-9, 2006; pp. 1696-1705.

*An Instruction Buffer for Low-Power DSP*; Brackenbury, M. L. L.; Advanced Research In Asynchronous Circuits And Systems, 2000 (ASYNC 2000) Proceedings, Sixth international Symposium On Eilat, Israel, Apr. 2-6, 2000; Los Alamitos, CA, USA; IEEE Comput. Soc., US; Apr. 2, 2000. pp. 176-186.

*An Ultra Low-Power Processor for Sensor Networks*; Ekanayake et al., V.; Sigplan Notices ACM, vol. 39, No. 11, Nov. 2004; pp. 27-36.

*ASPRO-216: A Standard-Cell Q.D.I. 16-Bit RISC Asynchronous Microprocessor*; Renaudin et al.; Proceedings. International Symposium On Advanced Research In Asychronous Circuits And Systems; Jan. 1, 1989, p. 2231.

*BitSNAP: Dynamic Significance Compression for a Low-Energy Sensor Network Asynchronous Processor*; Ekanayake et al., V.N.; Asynchronous Circuits & Systems, Mar. 14-16, 2005; pp. 144-154.

*B16—Ein Forth Prozessor im FPGA*; Bernd Paysan; INET (Online); Feb. 2, 2003, XP002490986; Retrieved from the Internet: url:http://www.jwdt.com/{paysan/b16.pdf> p. 1.

*C18 Colorforth Compiler*; Chuck Moore; Euroforth 2001 (Online); Nov. 26, 2001, XP002490985, Schloss Dagstuhl, Saarland, Germany; Retreived from the Internet: url:http://www.complang.tuwien.ac.at/anton/euroforth/ef01/moore01a.pdf> p. 1.

*Computer Archtecture: a Quantitative Approach*; Hennessy et al., John L.; Morgan Kaufmann Publishers, 3rd Edition, 2003; p. 98.

*Connection Machine Model CM-5 System Overview*; Palmer et al., Thinking Machine Corp., Cambridge, Mass., IEEE Jul. 1992, pp. 474-483.

*Datawave: A Single-Chip Multiprocessor for Video Applications*; Schmidt et al., U.; IEEE Micro, IEEE Service Center, vol. 11, No. 3, Jun. 1, 1991; pp. 22-25, 88.

*Energy Characterization of a Tiled Architecture Processor with On-Chip Networks*; Kim, J.S.; Proceedings of the 2003 International Symposium on Low Power Electronics & Design, Aug. 25-27 2003; pp. 424-427.

*Enhanced Serial Port on the 83C51FA*, Intel, Nov. 1987.

*Flits: Pervasive Computing for Processor and Memory Constrained Systems*, Majurski et al., NIST, pp. 31-38; not dated.

*Forth Session—The Evolution of Forth*, Rather et al., Sigplan Notices USA, vol. 28, No. 3, Mar. 1993, pp. 177-199.

*Functionally Asynchronous Array Processor for Morphological Filtering of Greyscale Images*; Robin et al., F.; IEEE Proceedings: Computers and Digital Techniques, vol. 143, No. 5, Sep. 24, 1996; pp. 273-281.

*IEEE Standard for Boot (Initialization Configuration) Firmware: Core Requirements and Practices*, IEEE Std 1275; 1994.

*Introduction to Java's Architecture*, Bill Venners, Artima.com; Jan. 8, 1999, pp. 1-10.

*iWarp: A 100-MPOS, LIW Microprocessor for Multicomputers*; Peterson et al.; IEEE Micro; IEEE Service Center, Los Alamitos, CA; vol. 11, No. 3, Jun. 1, 1991, pp. 26-29, 81-87.

*Low-Power Electronics Design*; Piguet, Christian; CRC Press, 2005, pp. 7-1-7-18.

*M68HC11 Microcontrollers Reference Manual*, Motorola, Rev.6, Apr. 2002, p. 29-31, 46, 203,234,549.

*Microchip, PIC18F6585/8585/6680/8680 Data Sheet*; Microchop, 2004; pp. 1-31, 229-248.

*Performance and Power Analysis of Globally Asynchronous Locally Synchronous Multi-Processor Systems*, Zhiyi Yu et al., Emerging VLSI Technologies And Architectures, 2006. IEEE Computer Society Annual Symposium On Klarlsruhe, Germany, Mar. 2-3, 2006, Piscataway, NJ, USA, IEEE, Mar. 2, 2006 pp. 378-383.

*The Architecture of the SC32 Forth Engine*; Hayes et al.; Journal of Forth Application And Research, Institute For Applied Forth Research; Rochester, US; vol. 5, No. 4, 1989, pp. 493-506 (pp. 500-501 Fig 3).

*The Computer Engineering Handbook*; Oklobdzija, Vojin G.; CRC Press, 2002; Chapter 7: Architectures for Low Power.

*The PASM Project: A Study of Reconfigurable Parallel Computing*; Siegel et al., H.J.; Parallel Architectures, Algorithms and Networks, Jun. 12-14, 1996; pp. 529-536.

*The Raw Microprocessor: A Computational Fabric For Software Circuits And General-Purpose Programs*; Agarwal et al.; IEEE Micro; IEEE, Service Center, Los Alamitos, CA; vol. 22, No. 2, Mar. 1, 2002, pp. 25-35.

*Use IRAM For Rasterization*, Kang Y et al., Image Processing, 1998, ICIP 98. Proceedings. 1998; International Conference on Chicago, IL, USA. Oct. 4-7, 1998, Los Alamitos, CA, USA, IEEE Comput. Soc. US, vol. 3,Oct. 4, 1998, pp. 1010-1013.

*VBScript Looping Statements*; W3Schools; www.w3schools.com/vbscript/vbsript_looping.asp; Jul. 2000.

*8Xc251SB Embedded Microcontroller User's Manual*, Intel, Feb. 1995, pp. 9-1 through 9-4.

*25x Emulator*; Chuck Moore; Euroforth 2001 (Online); Nov. 26, 2001, XP002490984, Schloss Dagstuhl, Saarland, Germany; Retreived from the Internet: p. 2, para 8, url:http://www.complang.tuwien.ac.at/anton/euroforth/ef01/moore01b.pdf>.

\* cited by examiner

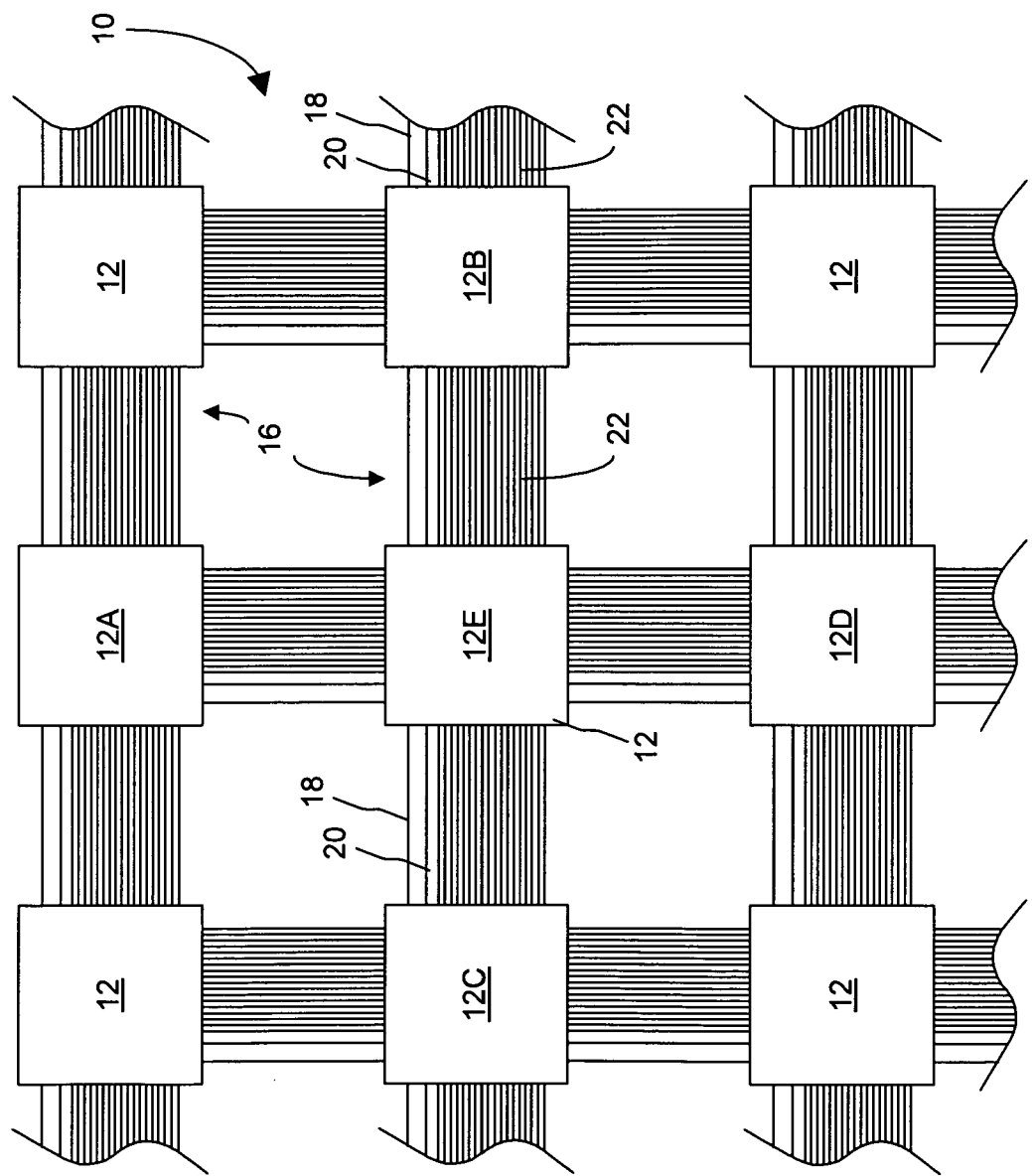

CIRCULAR REGISTER ARRAYS OF A COMPUTER

This application claims priority to provisional application No. 60/818,084, filed Jun. 30, 2006, and is a continuation-in-part of the application entitled, "Method and Apparatus for Monitoring Inputs to a Computer," filed May 26, 2006, Ser. No. 11/441,818, which is a continuation-in-part of the application entitled, "Asynchronous Power Saving Computer," filed Feb. 16, 2006, Ser. No. 11/355,513. This application also claims priority to provisional application No. 60/788,265, filed Mar. 31, 2006, and claims priority to provisional application No. 60/797,345, filed May 3, 2006. All of the cited applications above are incorporated herein by reference.

BACKGROUND OF THE INVENTION

1. Field of the Invention

The present invention relates to the field of computers and computer processors, and more particularly to a method and means for a more efficient use of a stack within a stack computer processor.

2. Description of the Background Art

Stack machines offer processor complexity that is much lower than that of Complex Instruction Set Computers (CISCs), and overall system complexity that is lower than that of either Reduced Instruction Set Computers (RICSs) or CISC machines. They do this without requiring complicated compilers or cache control hardware for good performance. They also attain competitive raw performance, and superior performance for a given price in most programming environments. Their first successful application area has been in real time embedded control environments, where they outperform other system design approaches by a wide margin. Where previously the stacks were kept mostly in program memory, newer stack machines maintain separate memory chips or even an area of on-chip memory for the stacks. These stack machines provide extremely fast subroutine calling capability and superior performance for interrupt handling and task switching.

However, there is no hardware detection of stack overflow or underflow conditions. Stack overflow occurs when there are not a sufficient number of registers available and results continue to be pushed onto the stack, causing the bottom register(s) to be overwritten. Stack underflow occurs when all registers have been emptied, and continued popping of a stack produces unintentional or incorrect results. Some other stack processors use stack pointers and memory management such that an error condition is flagged when a stack pointer goes out of range of memory allocated for the stack. U.S. Pat. No. 6,367,005 issued to Zahir et al. disclose a register stack engine, which saves to memory sufficient registers of a register stack to provide more available registers in the event of stack overflow. The register stack engine also delays the microprocessor until the engine can restore an appropriate number of registers in the event of stack underflow.

U.S. Pat. No. 6,219,685 issued to Story discloses a method of comparing the results of an operation with a threshold value. However, this approach does not distinguish between results that are rounded down to the threshold value (which would raise an overflow exception) and results that just happen to equal the threshold value. Another method disclosed by Story reads and writes hardware flags to identify overflow or underflow conditions. However, the instructions must be performed sequentially, and any instructions following a register read/write can not proceed until the read/write operation is completed, which makes for a slow process.

With a stack in memory, an overflow or underflow would overwrite a stack item or use a stack item that was not intended to be part of the stack. A need exists for an improved method of reducing or eliminating overflow and underflow within a stack.

SUMMARY OF THE INVENTION

It is an object of the present invention to provide an apparatus and method in which the data stack and return stack of a dual stack processor are not arrays in memory accessed by a stack pointer, but instead are hardwire accessed by a separate dedicated shift register.

It is another object of the present invention to reduce or eliminate overflow and underflow of a data or return stack.

It is another object of the present invention to minimize the length of electrical connections between one bit stack registers of a bi-directional stack register, and thereby minimize the required driver size and minimize buffering.

These and other objects are achieved by the presently described invention, in which a conventional stack is replaced by an array of registers which function in a circular, repeating pattern. This circular, repeating pattern is accomplished through utilization of an associated bi-directional shift register which contains a plurality of one bit shift registers electrically interconnected in an alternating pattern. This configuration prevents reading from outside of the stack, and prevents reading an unintended empty register value.

The above described dual stack processor can function as an independently functioning processor, or it can be used with several other like or different processors in an interconnected computer array.

BRIEF DESCRIPTION OF THE DRAWINGS

FIG. 6 is a detailed diagram showing a subset of the computers of FIG. 5 and a more detailed view of the interconnecting data buses of FIG. 5.

DETAILED DESCRIPTION

Figure 1:
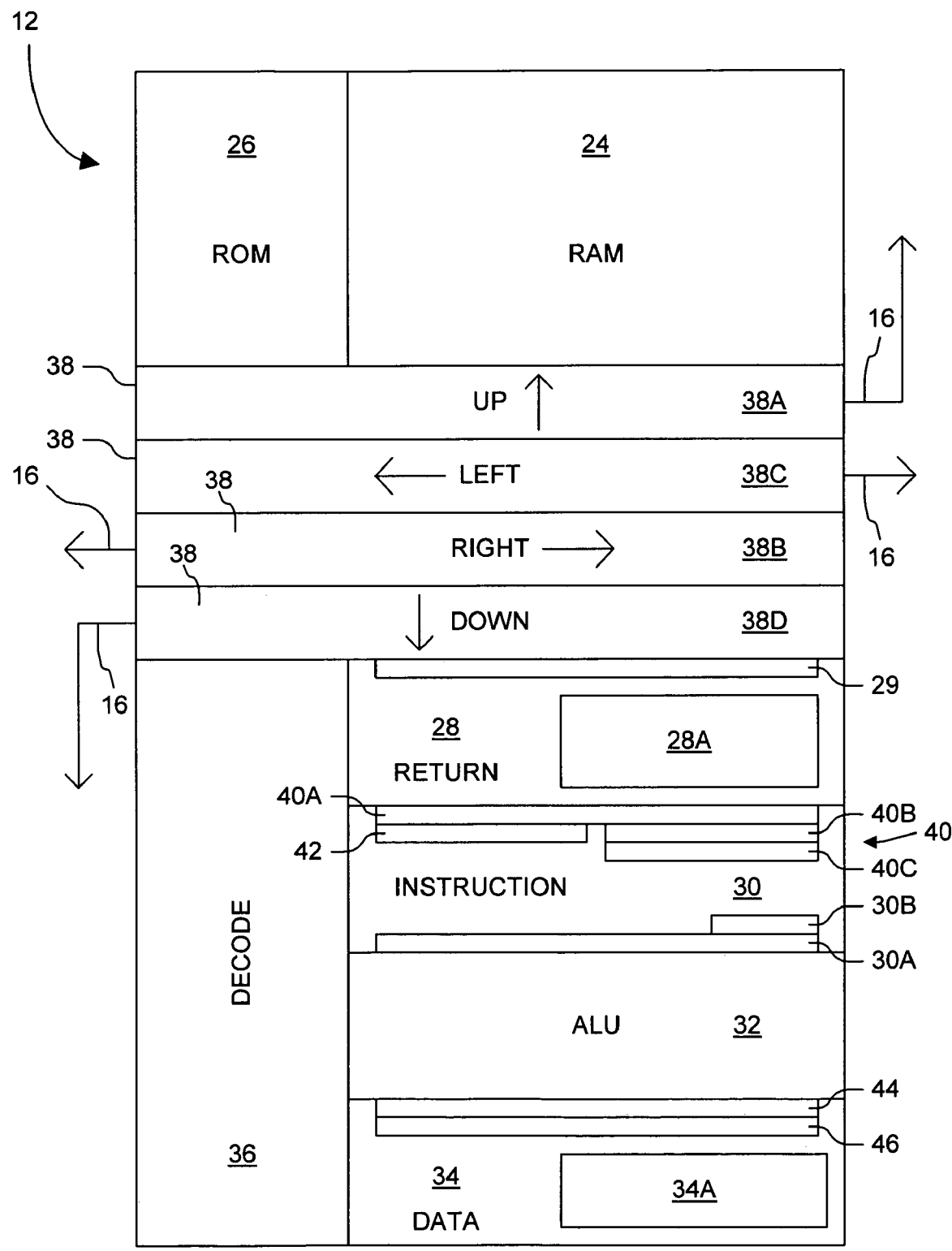
FIG. 1 is a block diagram depicting a general layout of a stack computer.

This invention is described with reference to the Figures, in which like numbers represent the same or similar elements. While this invention is described in terms of modes for achieving this invention's objectives, it will be appreciated by those skilled in the art that variations may be accomplished in view of these teachings without deviating from the spirit or scope of the presently claimed invention.

The embodiments and variations of the invention described herein, and/or shown in the drawings, are presented by way of example only and are not limiting as to the scope of the invention. Unless otherwise specifically stated, individual aspects and components of the invention may be omitted or modified for a variety of applications while remaining within the spirit and scope of the claimed invention, since it is intended that the present invention is adaptable to many variations.

FIG. 1 is a block diagram depicting the general layout of a dual stack computer 12 as used in the present invention. The computer 12 is generally a self contained computer having its own RAM 24 and ROM 26.

Other basic components of the computer 12 are a return stack 28, including an R register 29, an instruction area 30, an arithmetic logic unit (ALU or processor) 32, a data stack 34 and a decode logic section 36 for decoding instructions. The computer 12 is a dual stack computer having a data stack 34 and a separate return stack 28. One skilled in the art will be generally familiar with the operation of stack based computers such as the computer 12 of this example.

In the presently described embodiment, the instruction area 30 comprises a number of registers 40 including, in this example, an A register 40a, a B register 40b and a P register 40c. In this example, the A register 40a is a full eighteen-bit register, while the B register 40b and the P register 40c are nine-bit registers.

The present invention discloses a stack computer processor in which the data and return stacks comprise an array of registers, which function in a cyclical, repeating, or circular pattern. The data stack and return stack are not arrays in memory accessed by a stack pointer, as in many prior art computers.

Figure 2:
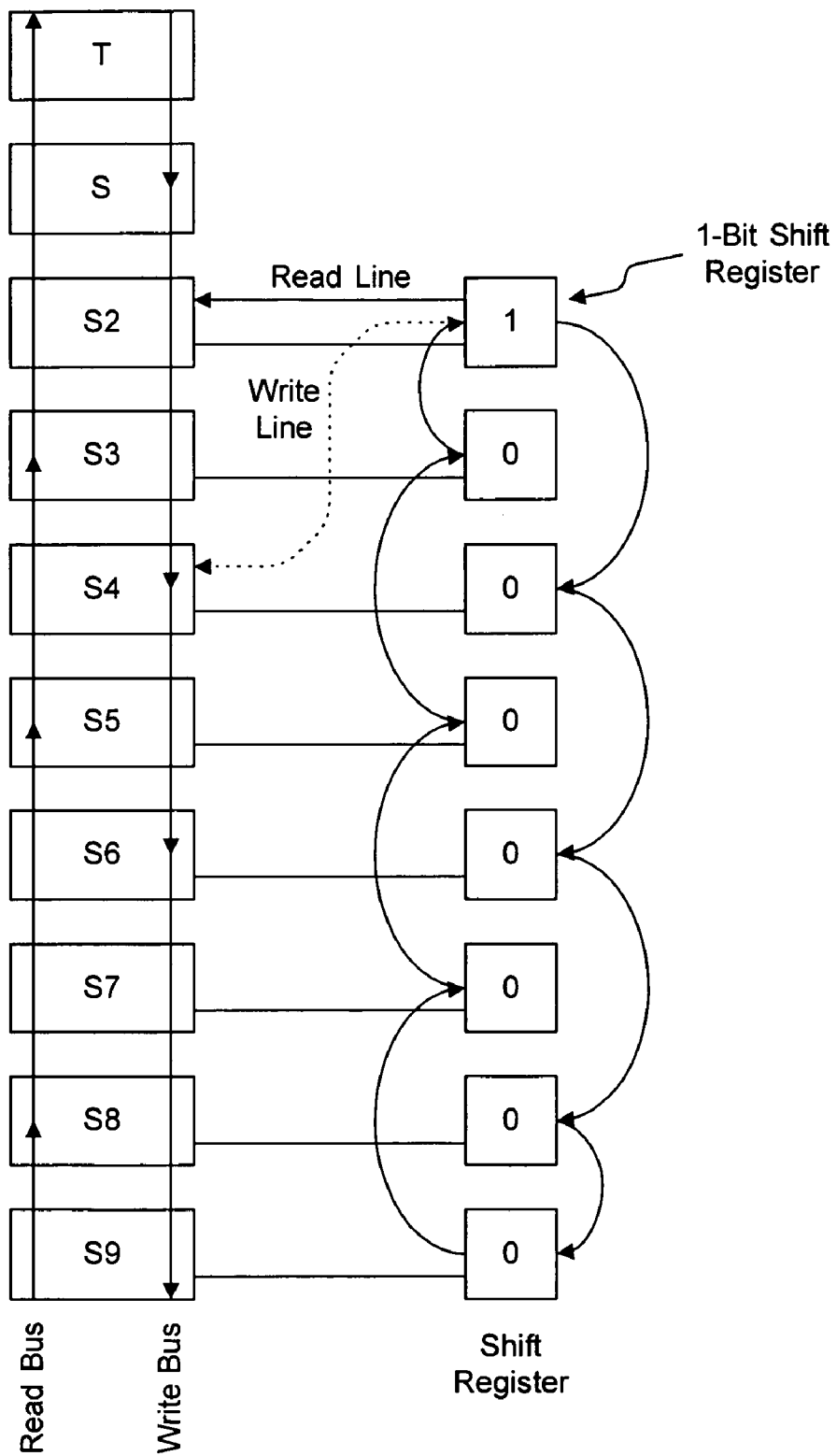
FIG. 2 is a data stack according to the present invention.

FIG. 2 discloses an embodiment of an 18-bit data stack according to the present invention. The top two registers in the data stack are an 18-bit T register and an 18-bit S register. The remainder of the data stack comprises eight additional 18-bit hardware registers, numbered in this example as $S_2$ through $S_9$. The circular register array, $S_2$-$S_9$ can operate in the absence of the T and S registers. However, the presence of at least the S register in combination with $S_2$-$S_9$ registers provides faster access circuitry and an optimum for timing, and therefore provides higher operating speed of the circular register array. In addition, the S register acts as a buffer between the $S_2$-$S_9$ addressable registers and the rest of the processor system. This provides independence of timing between the $S_2$-$S_9$ registers and the rest of the processor system.

This embodiment also comprises a bi-directional shift register which contains a plurality of one bit shift registers. The number of one bit shift registers is equal to the number of bottom stack registers, $S_2$ through $S_9$ located below the S register. Each one bit shift register is connected to its corresponding $S_2$ through $S_9$ stack register as shown in FIG. 2. The one bit shift registers are electrically interconnected in an alternating pattern, such that the $S_2$ through $S_9$ registers of the stack function in the sequential circular interconnect pattern given by $S_2 \rightarrow S_4 \rightarrow S_6 \rightarrow S_8 \rightarrow S_9 \rightarrow S_7 \rightarrow S_5 \rightarrow S_3 \rightarrow S_2$ as shown in FIG. 2. This sequential selection of bottom stack registers operates in a circular repeating pattern. The interconnecting wires of the one bit shift registers never span more than three adjacent shift registers, which avoids the need for a long wire connecting the bottom shift register to the top shift register. These shorter wires require a smaller driver, and buffering is also minimized. The embodiment given uses eight additional stack registers for the circular register array. However, other combinations of bottom registers used in multiples of four can also be utilized.

FIG. 2 also discloses a read bus and a write bus interconnecting registers $S_2$ through $S_9$ as well as the T register and the S register. Each one bit shift register of the bi-directional shift register is connected to a corresponding bottom stack register within the $S_2$ through $S_9$ array, where only one bit of the shift register is on (reads as a one) at a time, while all other bits read as a zero. At power-up, the shift register must be initialized to contain exactly one bit set to one and all other bits set to zero. In the given example, the shift register top bit points or reads to $S_2$ and writes to the interconnected adjacent register, $S_4$.

A ten cell deep push down stack is formed by the registers T, S, and $S_2$ through $S_9$. Because the bottom eight registers are in a circular buffer, the hardware wraps rather than overflows or underflows. One must not expect to put more than ten items there and get them all back, but one can keep taking more copies of the last eight items taken from the bottom of the stack forever. There is no underflow in the sense of it being an error. It is the fastest way to duplicate a pattern of eight words (or four or two or one) because the bottom eight will be read over and over if a program keeps taking values from the stack.

Similarly, there is no stack overflow in the sense of stack pointers allowing the stack to step on anything else. It is finite and if more than ten items are put there, only the last ten will remain; each store after the first ten will overwrite one of the $S_2$ through $S_9$ registers. There is no need to 'initialize' the stack to a preset location; one just declares it empty by starting to use it from wherever it is.

Figure 3:
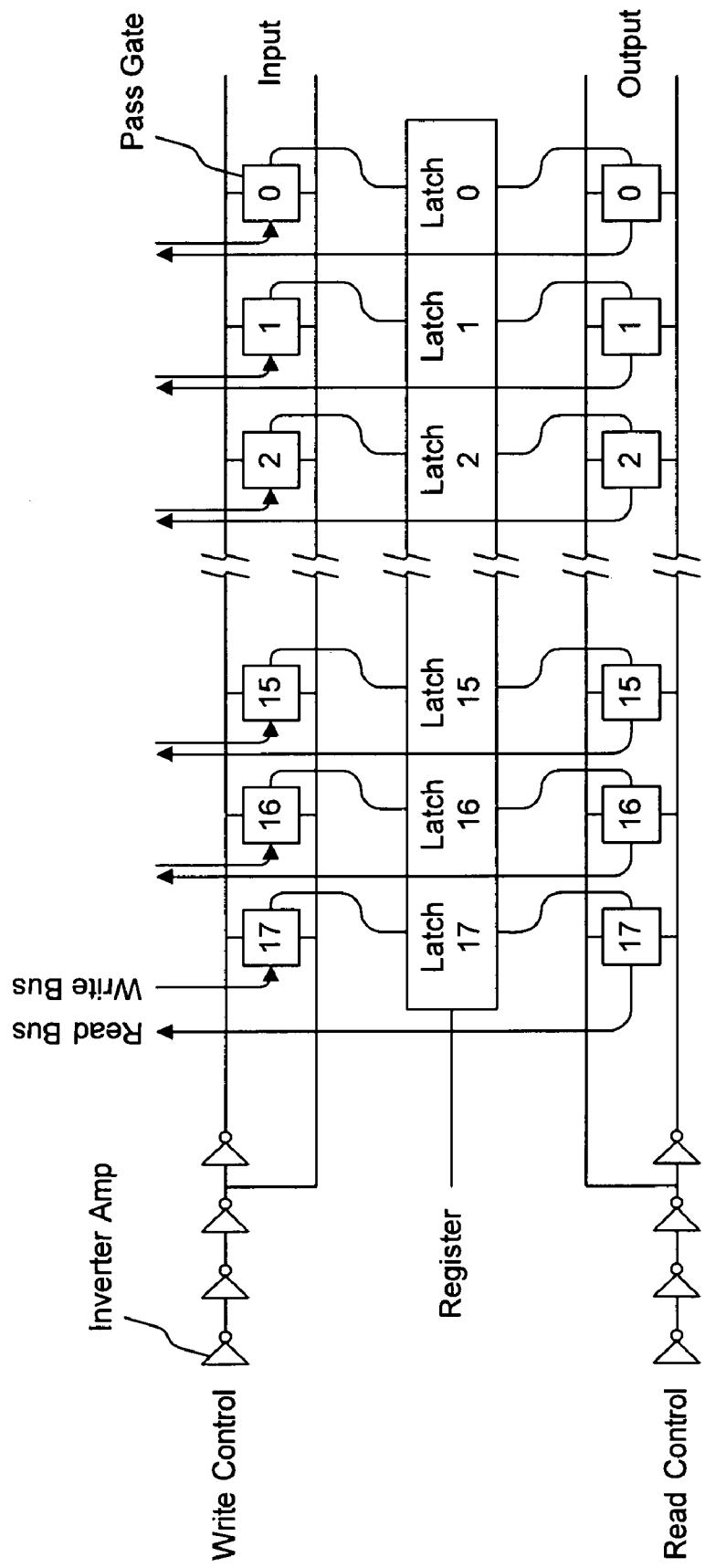
FIG. 3 is a more detailed view of a single register of a stack.

FIG. 3 is an expanded view of each register within the data or return stack. Each 18 bit register comprises 18 latches, numbered 0 through 17. There is a set of 18 input pass gates (numbered 0 through 17), each of which are connected to the 18 latches through a read bus and a write bus. There is also a set of 18 output pass gates (numbered 0 through 17), each of which is connected to the 18 latches through the read bus and the write bus. The input pass gates are controlled by a write control of inverter amps; the output pass gates are controlled by a read control of inverter amps.

Figure 4:
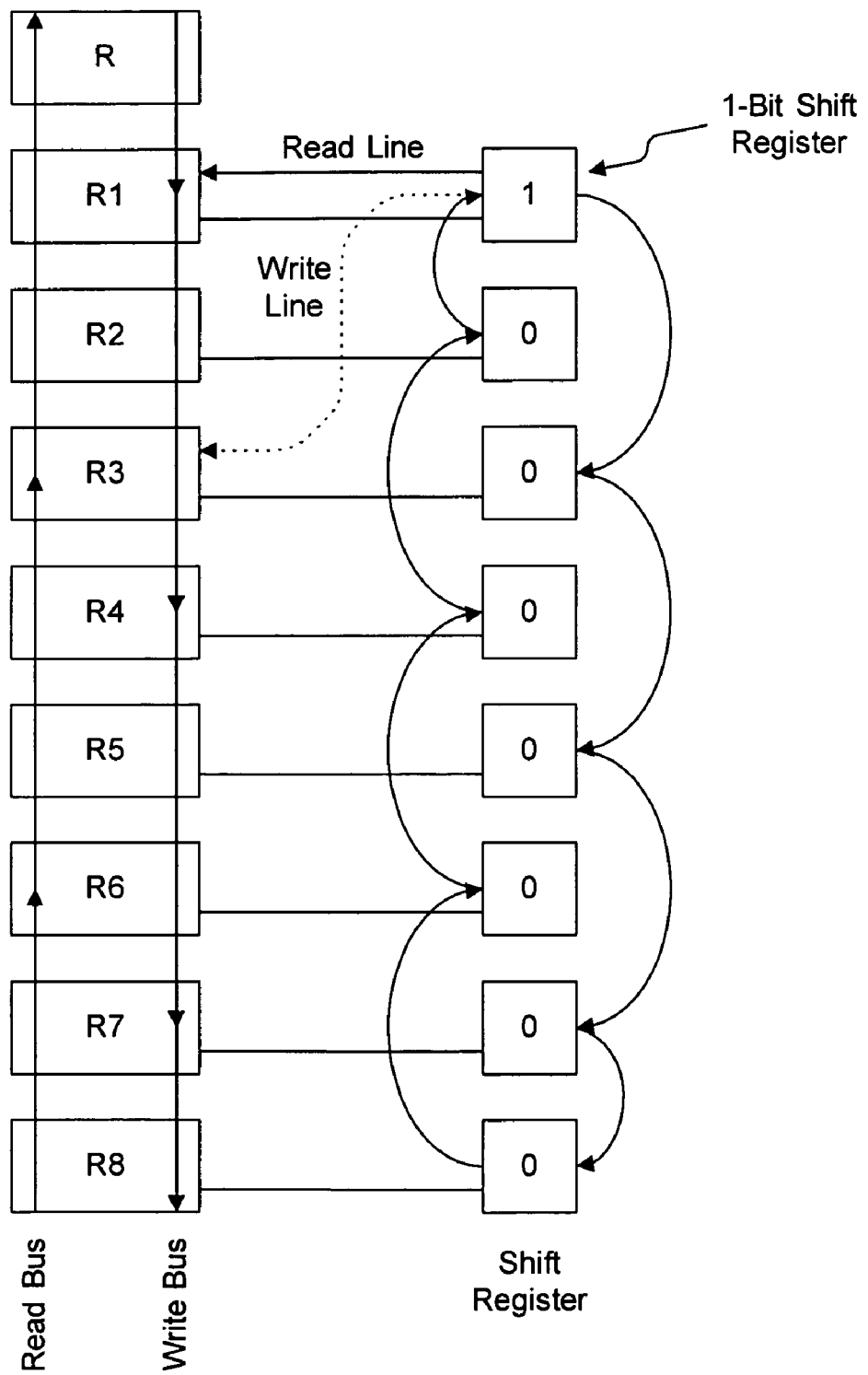
FIG. 4 is a return stack according to the present invention.

FIG. 4 discloses an 18-bit return stack according to the present invention. The top register in the return stack is an 18-bit R register, and eight additional 18-bit hardware registers are located below the R register, and are numbered here as $R_1$-$R_8$. The bottom eight registers, $R_1$-$R_8$ function in an alternating pattern as a repeating circular array, similar to the data stack disclosed above.

The circular register array, $R_1$-$R_8$ can operate in the absence of the R register. However, the presence of the R register in combination with $R_1$-$R_8$ registers provides faster access circuitry and an optimum for timing, and therefore provides higher operating speed of the circular register array. In addition, the R register acts as a buffer between the $R_1$-$R_8$ addressable registers and the rest of the processor system, which provides independence of timing between the $R_1$-$R_8$ registers and the rest of the processor system.

This embodiment also comprises a bi-directional shift register which contains a plurality of one bit shift registers. The number of one bit shift registers is equal to the number of additional bottom registers, $R_1$ through $R_8$ located below the R register. Each one bit shift register is connected to its corresponding $R_1$ through $R_8$ bottom stack register as shown in FIG. 4. The one bit shift registers of the bi-directional shift register are electrically interconnected in an alternating pattern, such that the $R_1$ through $R_8$ registers of the stack function in the sequential circular interconnect pattern given by $R_1 \rightarrow R_3 \rightarrow R_5 \rightarrow R_7 \rightarrow R_8 \rightarrow R_6 \rightarrow R_4 \rightarrow R_2 \rightarrow R_1$ as shown in FIG. 4. This sequential selection of registers operates in a circular repeating pattern. The interconnecting wires of the shift register never span more than three adjacent one bit shift registers, which avoids the need for a long wire connecting the bottom one bit shift register to the top one bit shift register. These shorter wires require a smaller driver, and buffering is also minimized. Although eight additional return registers are disclosed in the given embodiment, other bottom register combinations which are a multiple of four can also be used in the circular register array. A read bus and a write bus interconnect registers $R_1$-$R_8$. Each one bit register of the shift register is connected to a corresponding stack register within the $R_1$-$R_8$ array. Only one bit of the shift register is on (reads as a one) at a time, while all other bits read as a zero. At power-up, the shift register must be initialized to contain exactly one bit set to one and all other bits set to zero. In the given example, the shift register top bit points or reads to $R_1$ and writes to the interconnected adjacent register, $R_3$.

In the instant invention, there is no hardware detection of stack overflow or underflow conditions. Generally, prior art processors use stack pointers and memory management, or the like, such that an error condition is flagged when a stack pointer goes out of the range of memory allocated for the stack. When the stacks are located or managed in memory, an overflow or underflow would overwrite a stack item or use a stack item as something other than what it was intended. However, because the present invention bottom registers function as a circular array, the stacks cannot overflow or underflow out of the stack area. Instead, the circular arrays will merely wrap around the array of registers. Because the stacks have finite depth, pushing anything to the top of a stack means something on the bottom is being overwritten. Pushing more than ten items to the data stack, or more than nine items to the return stack in the given embodiments must be done with the knowledge that doing so will result in the item at the bottom of the stack to be overwritten.

It is the responsibility of software to keep track of the number of items on the stacks and not try to put more items there than the respective stacks can hold. The hardware will not detect an overwriting of items at the bottom of the stack or flag it as an error. It should be noted that the software can take advantage of the circular arrays at the bottom of the stacks in several ways. As one example, the software can simply assume that a stack is 'empty' at any time. There is no need to clear old items from the stack as they will be pushed down towards the bottom where they will be lost as the stack fills, so there is nothing to initialize for a program to assume that the stack is empty.

Another advantage which can be utilized is to reuse the register items without having to reload those items for reuse. The bottom eight items in these stacks can also be read or read and written in loops that take advantage of the stack wrap. After two data stack reads, T and S will have copies of two items from the circular array of the eight stack registers below. After eight more reads, T and S will be reloaded again with the same values read again from below using stack wrap. There is no limit to how many times those eight items can be read in sequence off of the stack without having to duplicate the items or write them back to the stack. Algorithms that cycle through a set of parameters that can repeat in eight, four, or two cells on the data or return stack can repeatedly read them from the stack as the bottom registers will just wrap, and if intentional is not a stack error.

Although the instant invention has been described in an embodiment for a data stack and return stack of a dual stack 18-bit processor, other bit size processors can be utilized with the present invention.

The above described circular register arrays were described with respect to a single dual stack processor. However, the above described circular register arrays can also be utilized in an array of several self-contained computers, such as the computer array 10 shown in FIG. 5. The computer array 10 has a plurality (twenty four in the example shown) of computers 12 (sometimes also referred to as "cores" or "nodes" in the example of an array). In the example shown, all of the computers 12 are located on a single die 14. According to the present invention, each of the computers 12 is a generally independently functioning computer. The computers 12 are interconnected by a plurality of interconnecting data buses 16. In this example, the data buses 16 are bidirectional asynchronous high speed parallel data buses, although it is within the scope of the invention that other interconnecting means might be employed for the purpose.

Figure 5:
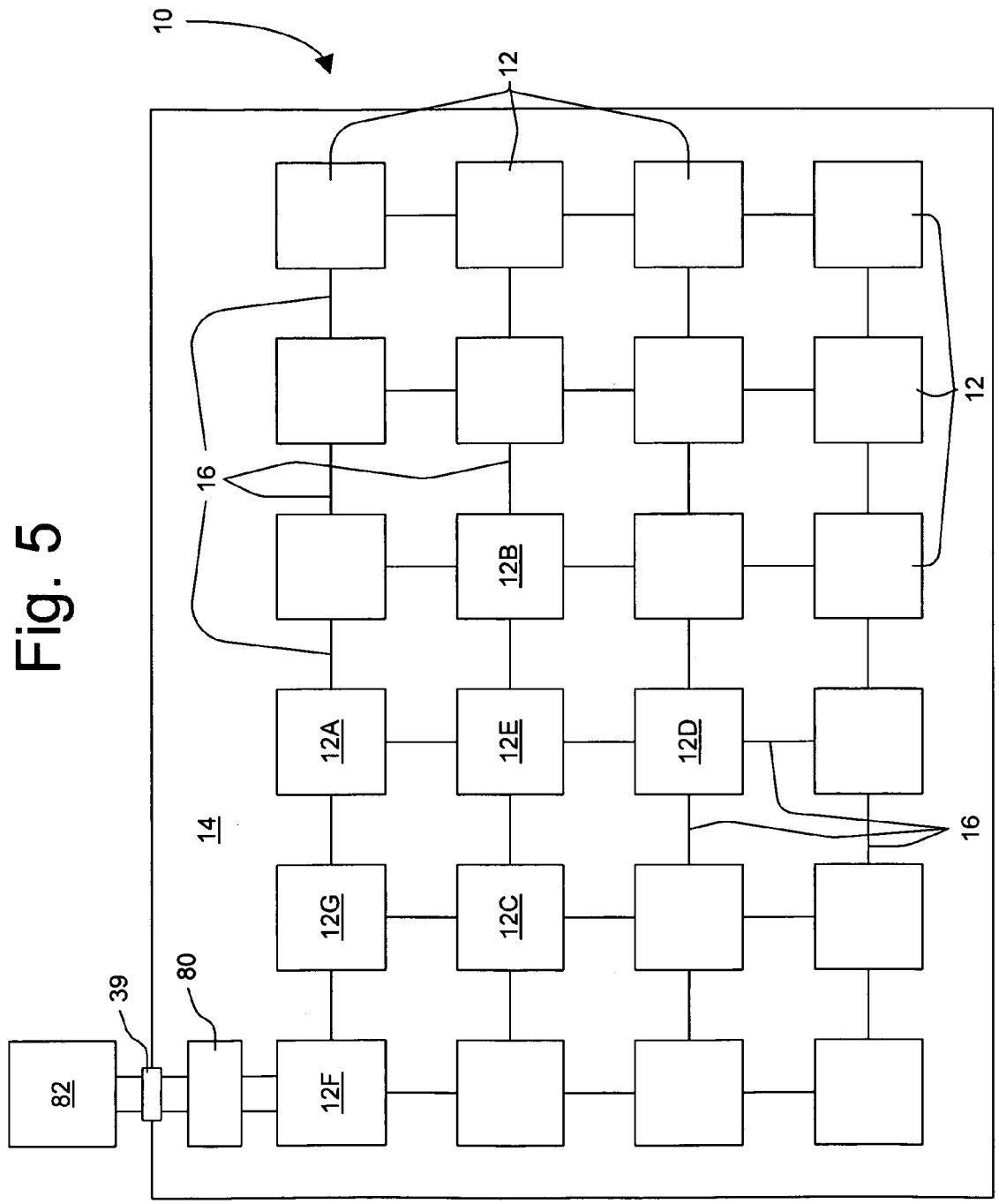
FIG. 5 is a diagrammatic view of a computer array, according to the present invention.

Computer 12e is an example of one of the computers 12 that is not on the periphery of the array 10. That is, computer 12e has four orthogonally adjacent computers 12a, 12b, 12c, and 12d. This grouping of computers 12a through 12e will be used, by way of example, hereinafter in relation to a more detailed discussion of the communications between the computers 12 of the array 10. As can be seen in the view of FIG. 5, interior computers such as computer 12e will have four other computers 12 with which they can directly communicate via the buses 16. In the following discussion, the principles discussed will apply to all of the computers 12 except that the computers 12 on the periphery of the array 10 will be in direct communication with only three or, in the case of the corner computers 12, only two other of the computers 12.

FIG. 6 is a more detailed view of a portion of FIG. 5 showing only some of the computers 12 and, in particular, computers 12a through 12e, inclusive. The view of FIG. 6 also reveals that the data buses 16 each have a read line 18, a write line 20, and a plurality (eighteen, in this example) of data lines 22. The data lines 22 are capable of transferring all the bits of one eighteen-bit instruction word generally simultaneously in parallel.

According to the present inventive method, a computer 12, such as the computer 12e can set high one, two, three, or all four of its read lines 18 such that it is prepared to receive data from the respective one, two, three, or all four adjacent computers 12. Similarly, it is also possible for a computer 12 to set one, two, three, or all four of its write lines 20 high.

When one of the adjacent computers 12a, 12b, 12c, or 12d sets a write line 20 between itself and the computer 12e high, if the computer 12e has already set the corresponding read line 18 high, then a word is transferred from that computer 12a, 12b, 12c, or 12d to the computer 12e on the associated data lines 22. Then, the sending computer 12 will release the write line 20 and the receiving computer (12e in this example) pulls both the write line 20 and the read line 18 low. The latter action will acknowledge to the sending computer 12 that the data has been received.

As shown in FIG. 1, in this embodiment of the invention, the computer 12 has four communication ports 38 for communicating with adjacent computers 12, as described above. The communication ports 38 are tri-state drivers, having an off status, a receive status (for driving signals into the computer 12) and a send status (for driving signals out of the computer 12). If the particular computer 12 is not on the interior of the array (FIG. 5) such as the example of computer 12e, then one or more of the communication ports 38 will not be used in that particular computer at least for the purposes described above. However, those communication ports 38 that do abut the edge of the die can have additional circuitry, either designed into such computer 12 or else external to the computer 12 but associated therewith, to cause such communication port 38 to act as an external I/O port 39 (FIG. 5). Examples of such external I/O ports 39 include, but are not limited to, USB (universal serial bus) ports, RS232 serial bus ports, parallel communications ports, analog to digital and/or digital to analog conversion ports, and many other possible variations. In FIG. 5, an "edge" computer 12f is depicted with associated interface circuitry 80 for communicating through an external I/O port 39 with an external device 82.

Various modifications may be made to the invention without altering its value or scope. For example, while this invention has been described herein using particular computers 12, many or all of the inventive aspects are readily adaptable to other computer designs, other computer arrays, and the like.

While the present invention has been disclosed primarily herein in relation to communications between computers 12 in an array 10 on a single die 14, the same principles and methods can be used, or modified for use, to accomplish other inter-device communications, such as communications between a computer 12 and its dedicated memory or between a computer 12 in an array 10 and an external device.

Similarly, while the present invention has been disclosed herein for a dual stack processor, the present invention can also be practiced for a single stack processor or a processor comprising more than two stacks.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

We claim:

1. A stack computer processor, comprising:
    a data stack, comprising an array of hardware data registers functioning in a circular pattern; and
    a return stack, comprising an array of hardware return registers functioning in a circular pattern; and wherein:
    each of said data registers in said data stack and each of said return registers in said return stack can accommodate an 18 bit instruction word;
    said computer is programmed to input additional data in said data stack after all said data registers in said data stack have been filled such that data in a first data register of the data stack will be overwritten;
    said computer is programmed to input additional data in said return stack after all said return registers in said return stack have been filled such that data in a first return resister of the return stack will be overwritten;
    said computer is programmed to repeatedly read data from said data stack without reloading data into said data registers in said data stack; and
    said computer is programmed to repeatedly read data from said return stack without reloading data into said return registers in said return stack.

2. The processor of claim 1, wherein said data stack further comprises a top of stack (T) register.

3. The processor of claim 2, wherein said data stack further comprises a second position on the stack (S) register.

4. The processor of claim 1, wherein said return stack further comprises a top register (R).

5. A method of manipulating a computer processor, comprising:
    inputting a plurality of instruction words into a corresponding plurality of instruction cells of said processor; and
    processing said plurality of instruction words, wherein:
    there is no overflow or underflow of instructions as a result of said inputting and said processing; and
    said processing comprises repeatedly reusing said plurality of instruction words without reloading said plurality of instruction words.

6. The method of claim 5, wherein said inputting comprises filling all available instruction cells.

7. The method of claim 6, wherein said inputting further comprises inputting additional instruction words after all available instruction cells have been filled such that previously-filled instruction cells are over-written.

8. The method of claim 7, wherein said inputting and said processing occur without using a software implemented pointer.

9. A computer processor, comprising:
    an array of registers; and
    a shift register, wherein:
    said shift register comprises a plurality of one bit shift registers which are interconnected by electrical wires, and wherein said plurality of one bit shift registers is equal in number to a number of registers in said array of registers;
    said computer processor is programmed to input additional data in said array of registers after all of said registers are full such that data in a first register of the array is overwritten; and
    said processor is programmed to repeatedly read data from said array of registers without reloading data into said array of registers.

10. The processor of claim 9, further comprising at least one register positioned above said array of registers.

11. The processor of claim 9, wherein said array of registers further comprises a read bus and a write bus interconnecting said array.

12. The processor of claim 9, wherein said array of registers functions in a circular pattern.

13. The processor of claim 9, wherein said array of registers are stacked.

14. The processor of claim 13, wherein said one bit shift registers are interconnected by said electrical wires in an alternating pattern.

15. The processor of claim 9, wherein said processor is a data stack.

16. The processor of claim 15, wherein said array of registers comprises eight data registers.

17. The processor of claim 15, wherein said array of registers comprises a multiple of four data registers.

18. The processor of claim 9, wherein said processor is a return stack.

19. The processor of claim 18, wherein said array of registers comprises eight return registers.

20. The processor of claim 18, wherein said array of registers comprises a multiple of four return registers.

21. A computer processor, comprising:
    an array of registers; and
    a bi-directional shift register hardwired to said array of registers, further comprising a plurality of one bit shift registers which are interconnected by electrical wires, and wherein said plurality of one bit shift registers is equal in number to a number of registers in said array of registers; and wherein
    said computer processor is programmed to input additional data in said array of registers after all of said registers are full such that data in a first register of the array is overwritten; and
    said computer processor is programmed to repeatedly read data from said array of registers without reloading data into said array of registers.

22. The processor of claim 21, further comprising at least one register positioned above said array of registers.

23. The processor of claim 21, wherein said shift register functions as a hardware pointer to said array of registers.

24. The processor of claim 21, further comprising a read bus and a write bus.

25. The processor of claim 21, wherein each of said plurality of one bit shift registers corresponds to an associated register of said array of registers.

26. The processor of claim 25, wherein only one shift register of said plurality of one bit shift registers is activated at one time.

27. The processor of claim 21, wherein said array of registers further comprises a reed bus and a write bus interconnecting said array.

28. The processor of claim 21, wherein said plurality of one bit shift registers are interconnected by electrical wires such that a size of a driver and buffering are minimized.

29. The processor of claim 21, wherein all of said electrical wires extend between a maximum of three adjacent one bit shift registers.

30. The processor of claim 29, wherein said array of registers comprises eight registers.

31. The processor of claim 21, wherein said processor is a data stack.

32. The processor of claim 21, wherein said processor is a return stack.

33. The processor of claim 1, further comprising:
a hardware pointer to said array of hardware data registers of said data stack; and
a hardware pointer to said array of hardware return registers of said return stack.

34. The processor of claim 33, wherein:
said hardware pointer for said data stack includes a circular array of shift registers, each of said shift registers being connected to one of said data registers in said data stack; and
said hardware pointer for said return stack includes a circular array of shift registers, each of said shift registers being connected to one of said return registers in said return stack.

35. The processor of claim 34, wherein:
said circular array of shift registers for said data stack are one-bit shift registers; and
said circular array of shift registers for said return stack are one-bit shift registers.

36. The processor of claim 35, wherein:
only one of said one-bit shift registers for said data stack is active at a time; and
only one of said one-bit shift registers for said return stack is active at a time.

37. The processor of claim 34, wherein the shift registers for at least one of said data stack and said return stack are interconnected by electrical wires in an alternating pattern.

38. The processor of claim 37, wherein said electrical wires extend between a maximum of three adjacent shift registers.

39. The processor of claim 34, wherein:
said shift registers for said data stack are bi-directional in operation; and
said shift registers for said return stack are bi-directional in operation.

40. The processor of claim 1, wherein loading data into said data stack and said return stack does not generate an underflow or an overflow.

41. The processor of claim 1, further comprising a read bus and a write bus interconnecting said hardware registers of at least one of said data stack and said return stack.

42. The processor of claim 1, wherein said array of hardware registers of at least one of said data stack and said return stick comprises a multiple of four registers.

43. The processor of claim 42, wherein the number of hardware registers is eight.

44. The method of claim 5, wherein said instruction cells are an array of hardware registers.

45. The method of claim 44, wherein said processing includes accessing said array of hardware registers using a hardware pointer.

46. The method of claim 45, wherein said hardware pointer comprises a circular array of shift registers, each of said shift registers being connected to one of said hardware registers.

47. The method of claim 46, wherein said circular array of shift registers is a circular array of one-bit shift registers.

48. The method of claim 47, wherein only one of said one-bit shift registers is active at a time.

49. The method of claim 46, wherein said shift registers are interconnected by electrical wires in an alternating pattern.

50. The method of claim 49, wherein said electrical wires extend between a maximum of three adjacent shift registers.

51. The method of claim 45, wherein:
said shift registers for said data static are bi-directional in operation; and
said shift registers for said return stack are bi-directional in operation.

52. The method of claim 5, wherein the number of said instruction cells is a multiple of four.

53. The method of claim 52, wherein the number of instruction cells is eight.

54. The method of claim 5, wherein a read bus and a write bus interconnect plurality of instruction cells.

55. The method of claim 5, wherein one of said instruction cells is a top (T) instruction cell.

56. The method of claim 5, wherein one of said instruction cells is a second position (S) instruction cell.

57. The method of claim 5, wherein one of said instruction coils is a top instruction cell (R).

58. The processor of claim 14, wherein said electrical wires extend between a maximum of three adjacent one bit shift registers.

59. The processor of claim 9, wherein only one of said one bit shift registers is active at a time.

60. The processor of claim 9, wherein said array of registers and said shift register are implemented in hardware.

61. The processor of claim 9, wherein no overflow or underflow occurs in said array of registers.

62. The processor of claim 29, wherein said array of registers comprises a multiple of four registers.

63. The processor of claim 21, wherein said one bit shift registers are connected in a circular pattern.

64. The processor of claim 21, wherein no overflow or underflow occurs in said array of registers.

65. The processor of claim 21, wherein said array of registers and said shift register are implemented in hardware.

* * * * *